United States Patent
Seki et al.

(10) Patent No.: US 9,976,286 B2
(45) Date of Patent: May 22, 2018

(54) WORK MACHINE AND CORRECTION METHOD OF WORKING EQUIPMENT PARAMETER FOR WORK MACHINE

(71) Applicant: Komatsu Ltd., Minato-ku, Tokyo (JP)

(72) Inventors: Masanobu Seki, Fujisawa (JP); Tsutomu Iwamura, Yokohama (JP); Katsuhiro Ikegami, Hiratsuka (JP); Masashi Ichihara, Hiratsuka (JP)

(73) Assignee: Komatsu Ltd., Minato-ku, Tokyo (JP)

( * ) Notice: Subject to any disclaimer, the term of this patent is extended or adjusted under 35 U.S.C. 154(b) by 63 days.

(21) Appl. No.: 15/032,092

(22) PCT Filed: Oct. 30, 2015

(86) PCT No.: PCT/JP2015/080839
§ 371 (c)(1),
(2) Date: Apr. 26, 2016

(87) PCT Pub. No.: WO2016/056676
PCT Pub. Date: Apr. 14, 2016

(65) Prior Publication Data
US 2017/0260717 A1    Sep. 14, 2017

(51) Int. Cl.
*E02F 3/43* (2006.01)
*E02F 9/26* (2006.01)
(Continued)

(52) U.S. Cl.
CPC ............... *E02F 9/265* (2013.01); *E02F 3/32* (2013.01); *E02F 3/435* (2013.01); *E02F 9/2271* (2013.01);
(Continued)

(58) Field of Classification Search
None
See application file for complete search history.

(56) References Cited

U.S. PATENT DOCUMENTS

| | | | |
|---|---|---|---|
| 9,644,346 B2* | 5/2017 | Seki | E02F 9/264 |
| 2009/0228169 A1* | 9/2009 | Chiorean | E02F 3/435 |
| | | | 701/29.1 |

(Continued)

FOREIGN PATENT DOCUMENTS

| | | |
|---|---|---|
| JP | H09-111798 | 4/1997 |
| JP | 2000-008401 | 1/2000 |

(Continued)

OTHER PUBLICATIONS

International Search Report and Written Opinion in International Application No. PCT/JP2015/080839, dated Jan. 19, 2016, 7 pages (with English Translation).

*Primary Examiner* — Lail A Kleinman
(74) *Attorney, Agent, or Firm* — Fish & Richardson P.C.

(57) ABSTRACT

A work machine includes: first working equipment with first working equipment parameter; second working equipment including a parallel link and being attachable to the first working equipment; a swing angle detector that detects swing angle information of the first working equipment; an attitude calculating unit that calculates an attitude of the first working equipment based on the detected swing angle information of the first working equipment; a working equipment parameter storage that stores the first working equipment parameter defined for a component of the first working equipment; a correction information acquiring unit that acquires information on the second working equipment as correction information; and a working equipment parameter correction unit that corrects the first working equipment parameter based on the correction information on the second working equipment acquired by the correction information acquiring unit.

8 Claims, 15 Drawing Sheets

(51) Int. Cl.
  *E02F 9/22* (2006.01)
  *E02F 3/32* (2006.01)
  *B60W 50/14* (2012.01)
  *E02F 3/40* (2006.01)

(52) U.S. Cl.
  CPC ........ *B60W 2050/146* (2013.01); *E02F 3/401* (2013.01)

(56) References Cited

U.S. PATENT DOCUMENTS

2013/0158788 A1  6/2013  Seki
2016/0115669 A1* 4/2016  Gorman .................... E02F 3/32
                                                  701/50

FOREIGN PATENT DOCUMENTS

| JP | 2012-202061 | 10/2012 |
| KR | 10-2003-0084048 | 11/2003 |
| WO | WO 2015/137527 | 9/2015 |

\* cited by examiner

WORK MACHINE AND CORRECTION METHOD OF WORKING EQUIPMENT PARAMETER FOR WORK MACHINE

CROSS-REFERENCE TO RELATED APPLICATIONS

This application claims priority to International Application No. PCT/JP2015/080839 filed on Oct. 30, 2015, the contents of which are incorporated herein in their entirety.

TECHNICAL FIELD

The present invention relates to a work machine and a correction method of a working equipment parameter for a work machine.

BACKGROUND ART

A hydraulic excavator including a position detecting unit configured to detect the current position of a work point of working equipment has been known. For instance, in a hydraulic excavator disclosed in Patent Literature 1, the position coordinates of a blade edge of a bucket is calculated based on position information from a GPS antenna. Specifically, the position coordinates of the blade edge of the bucket are calculated based on parameters such as a positional relationship between the GPS antenna and a boom pin, the respective lengths of the boom, arm and bucket, and the respective direction angles of the boom, arm and bucket. The position coordinate of each of the arm and bucket is calculated based on a sensor output value acquired from, for instance, a stroke sensor, which is attached to a cylinder for swinging each of the arm and bucket to acquire an extension/retraction state of the cylinder.

With such a technique, the position of the blade edge of the bucket can be estimated by a controller of the hydraulic excavator to move the blade edge of the bucket in conformity with a designed excavated surface, thereby preventing the excavated surface from being excessively excavated with the bucket and efficiently performing the excavation work.

For the above technique, it is important that the controller of the hydraulic excavator should accurately detect the position of the blade edge of the bucket. Accordingly, in the technique disclosed in Patent Literature 1, for instance, five of the attitudes of the blade edge of the bucket of the working equipment are measured by an external measurement device such as a total station, and the controller of the hydraulic excavator calibrates working equipment parameters necessary for calculation of the position of the blade edge based on the resulting measurement value of the blade edge of the bucket.

CITATION LIST

Patent Literature(S)

Patent Literature 1: JP-A-2012-202061

SUMMARY OF THE INVENTION

Problem(s) to be Solved by the Invention

In order to enlarge workable area, such a work machine (e.g. hydraulic excavator) is sometimes provided with second working equipment (e.g. an extension arm).

In such an arrangement, the position of the blade edge of the bucket has to be calculated with reference to the length of the working equipment attached with the extension arm and an angle sensor provided to each of the working equipment.

However, such a process requires a calibration for working equipment parameter after attaching the second working equipment such as the extension arm, which results in additional time and workload.

Further, when the second working equipment such as an extension arm is detached to be restored to the normal working equipment, since a switching operation between the modified work machine (i.e. work machine with the second working equipment) and the normal work machine (i.e. work machine with the normal working equipment) is not available, a calibration is again required.

An object of the invention is to provide a work machine and a correction method of a working equipment parameter for a work machine, which are capable of ensuring accuracy of the position of a blade edge without requiring any calibration before and after attaching second working equipment (e.g. extension arm).

Means for Solving the Problem(s)

A work machine according to a first aspect of the invention includes:
 a work machine body;
 first working equipment swingably connected to the work machine body;
 second working equipment attachable to the first working equipment and including a parallel link;
 a swing angle detector configured to detect swing angle information of the first working equipment with respect to the work machine body;
 an attitude calculating unit configured to calculate an attitude of the first working equipment based on the detected swing angle information of the first working equipment;
 a working equipment parameter storage configured to store a first working equipment parameter that is set for a component of the first working equipment;
 a correction information acquiring unit that is configured to acquire information on the second working equipment as correction information; and
 a working equipment parameter correction unit that is configured to correct the first working equipment parameter based on the correction information acquired by the correction information acquiring unit.

The calibration device of a work machine according to a second aspect of the invention includes, in the first aspect of the invention, a hydraulic cylinder configured to swing the first working equipment, in which
 the swing angle detector is a stroke displacement detector configured to detect a stroke displacement of the hydraulic cylinder.

The work machine according to a third aspect of the invention is, in the first aspect or second aspect of the invention, further includes a display unit, in which
 the working equipment parameter correction unit displays the attitude of the first working equipment or an attitude of the second working equipment on the display unit.

The work machine according to a fourth aspect of the invention is, in any one of the first to third aspects of the invention, the working equipment parameter corrected by the working equipment parameter correction unit is outputted to the working equipment controller configured to control the first working equipment.

The work machine according to a fifth aspect of the invention is, in any one of the first to fourth aspects of the invention, the first working equipment includes an arm and a bucket.

The work machine according to a sixth aspect of the invention is, in the fifth aspect of the invention, the second working equipment is a parallel-link working equipment provided at an end of the arm.

The work machine according to a seventh aspect of the invention is, in any one of the first to sixth aspects of the invention, the work machine body includes a carrier, and an upper structure.

A method according to an eighth aspect of the invention is a correction method of a parameter for a work machine, the work machine including:

a work machine body;

first working equipment swingably connected to the work machine body;

second working equipment attachable to the first working equipment and including a parallel link;

a swing angle detector configured to detect swing angle information of the first working equipment with respect to the work machine body;

an attitude calculating unit configured to calculate an attitude of the first working equipment based on the detected swing angle information of the first working equipment; and a working equipment parameter storage configured to store a first working equipment parameter that is set for a component of the first working equipment, the method being used for correcting the first working equipment parameter, the method including:

acquiring information on the second working equipment as correction information; and correcting the first working equipment parameter based on the acquired correction information, the acquiring of the information on the second working equipment and the correcting of the first working equipment parameter being performed by a computer.

BRIEF DESCRIPTION OF DRAWING(S)

DESCRIPTION OF EMBODIMENT(S)

Description will be made below on a calibration device and a correction method for a working equipment parameter according to an exemplary embodiment of the invention with reference to the attached drawings.

First Exemplary Embodiment

1. Overall Arrangement of Hydraulic Excavator 1

Figure 1:
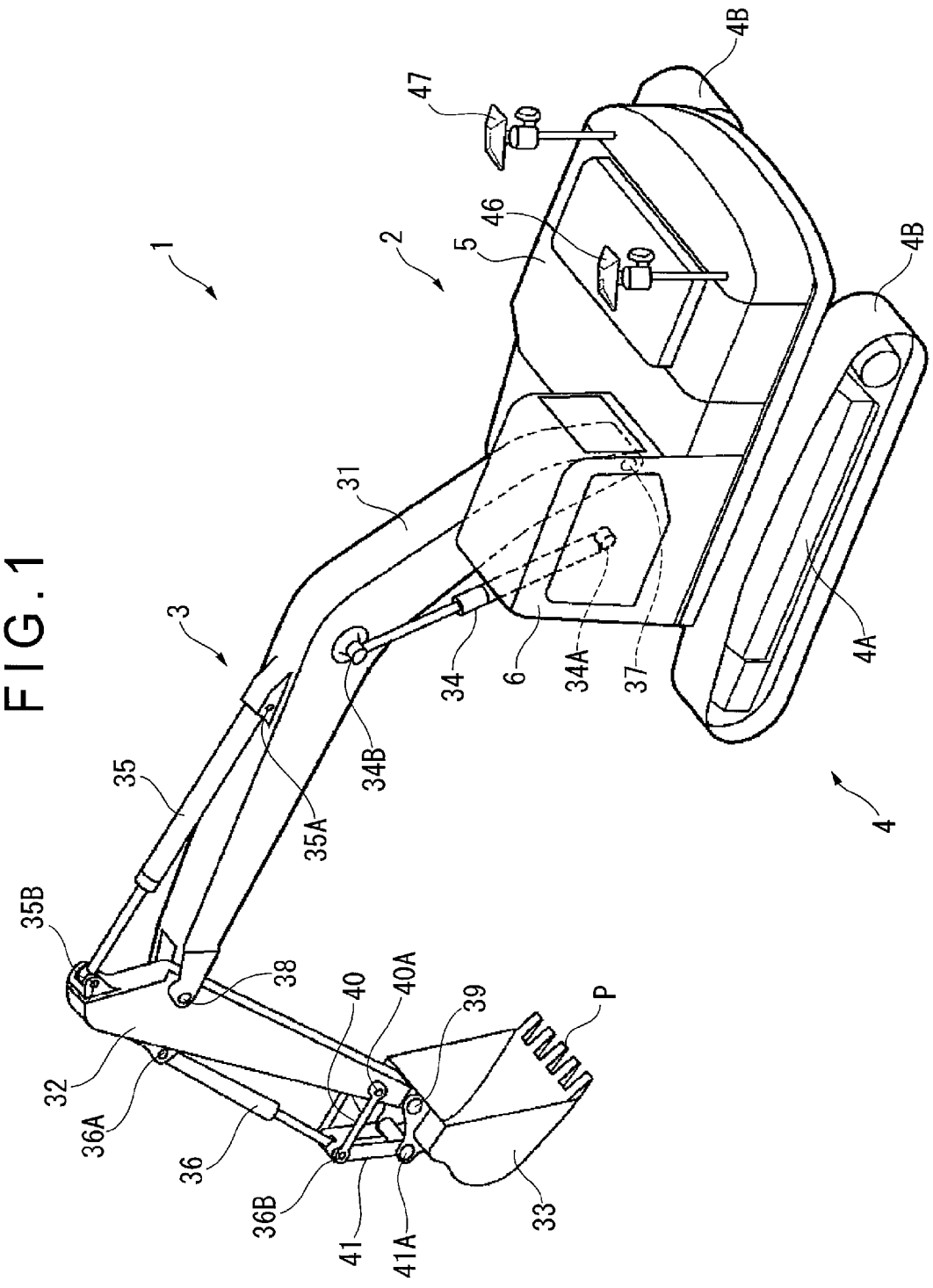
FIG. 1 is a perspective view showing a work machine according to a first exemplary embodiment of the invention.

FIG. 1 is a perspective view showing a hydraulic excavator 1, in which the calibration device according to the exemplary embodiment performs calibration. The hydraulic excavator 1 includes a work machine body 2 and working equipment 3.

The work machine body 2 includes an undercarriage 4 and an upper structure 5 swingably mounted on the undercarriage 4.

In the upper structure 5, components such as a hydraulic pump 54 and an engine 54A (both described later) are housed.

A front portion of the upper structure 5 is provided with a cab 6, in which a display input device 71 and an control device 51 (both described later) are provided in addition to a seat for an operator to be seated.

The undercarriage 4 includes a pair of travel devices 4A, each of which includes a crawler belt 4B. The rotation of the crawler belt 4B causes the hydraulic excavator 1 to travel. It should be noted that directions of front, rear, right and left are defined with reference to the line of sight of an operator seated on the seat according to the exemplary embodiment.

The working equipment 3, which is provided to a front portion of the work machine body 2, includes a boom 31, an arm 32, a bucket 33, a boom cylinder 34, an arm cylinder 35 and a bucket cylinder 36. It should be noted that the first working equipment of the invention at least includes the arm 32 and the bucket 33.

The boom 31 has a base end swingably attached to the front portion of the work machine body 2 with a boom pin 37. The boom pin 37 is a rotation center of the boom 31 relative to the upper structure 5.

The arm 32 has a base end swingably attached to a distal end of the boom 31 with an arm pin 38. The arm pin 38 is a rotation center of the arm 32 relative to the boom 31.

The bucket 33 is swingably attached to a distal end of the arm 32 with a bucket pin 39. The bucket pin 39 provided to the distal end of the arm 32 defines a rotation center of the bucket 33 relative to the arm 32. A reference point of the first working equipment is defined at a blade edge P of the bucket 33.

Antennas 46, 47 are provided on the upper structure 5, specifically on a handrail and the like provided on a counterweight.

The boom cylinder 34, the arm cylinder 35 and the bucket cylinder 36 are hydraulic cylinders hydraulically actuated to extend and retract.

The boom cylinder 34 has a base end swingably attached to the upper structure 5 with a boom cylinder foot pin 34A.

The boom cylinder 34 has a distal end swingably attached to the boom 31 with a boom cylinder top pin 34B. The boom cylinder 34 is hydraulically extended/retracted to move the boom 31.

The arm cylinder 35 has a base end swingably attached to the boom 31 with an arm cylinder foot pin 35A.

The arm cylinder 35 has a distal end swingably attached to the arm 32 with an arm cylinder top pin 35B. The arm cylinder 35 is hydraulically extended/retracted to move the arm 32 to perform an excavation or damping operation.

The bucket cylinder 36 has a base end swingably attached to the arm 32 with a bucket cylinder foot pin 36A.

The bucket cylinder 36 has a distal end swingably attached to a first end of the first link member 40 and a first end of the second link member 41 with a bucket cylinder top pin 36B.

A second end of the first link member 40 is swingably attached to the distal end of the arm 32 with a first link pin 40A.

A second end of the second link member 41 is swingably attached to the bucket 33 with a second link pin 41A. The bucket cylinder 36 is hydraulically extended/retracted to move the bucket 33 to perform an excavation or damping operation.

Figure 2A:
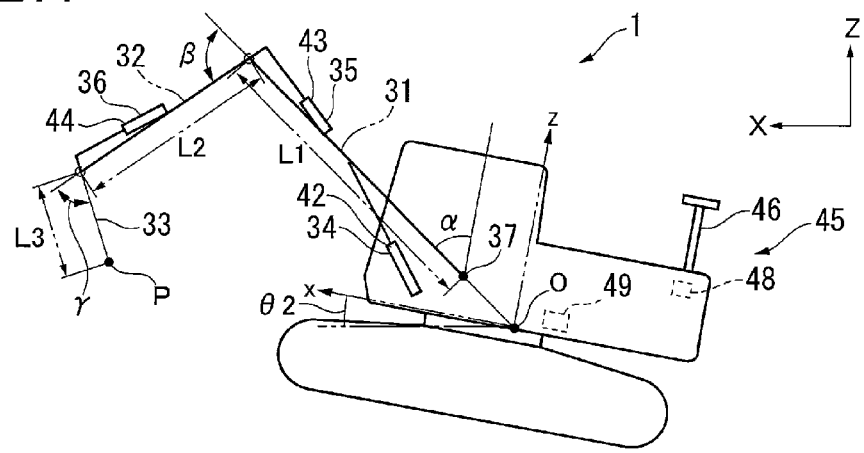
FIG. 2A is a schematic side view showing the work machine according to the exemplary embodiment.
Figure 2B:
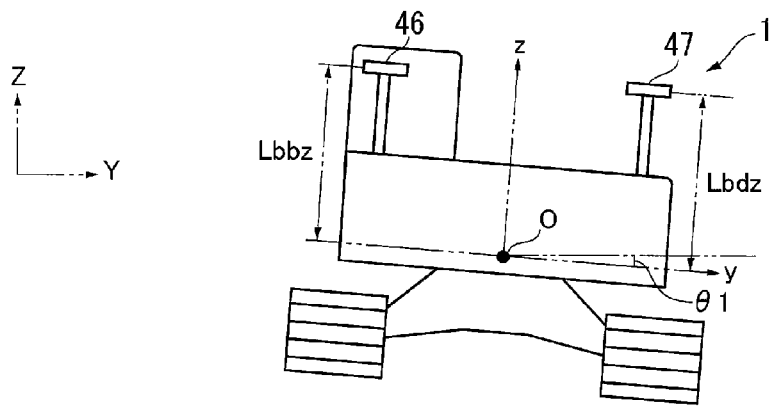
FIG. 2B is a schematic rear view showing the work machine according to the exemplary embodiment.
Figure 2C:
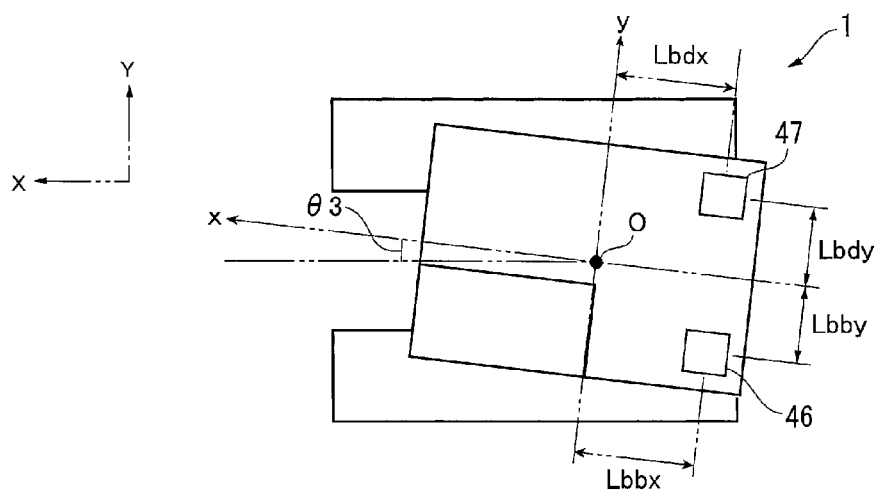
FIG. 2C is a schematic plan view showing the work machine according to the exemplary embodiment.

FIGS. 2A to 2C2 schematically show an arrangement of the hydraulic excavator 1. FIG. 2A is a side view showing the hydraulic excavator 1. FIG. 2B is a rear view showing the hydraulic excavator 1. FIG. 2C is a plan view showing the hydraulic excavator 1. As shown in FIG. 2A, L1 denotes a length of the boom 31 defined between the boom pin 37 and the arm pin 38. L2 denotes a length of the arm 32 defined between the arm pin 38 and the bucket pin 39. L3 denotes a length of the bucket 33 defined between the bucket pin 39 and a blade edge P of the bucket 33.

As shown in FIG. 2A, the work machine body 2 includes a position detector 45 that detects the current position of the work machine body 2 of the hydraulic excavator 1. The position detector 45 includes two antennas 46, 47 for real time kinematic-global navigation satellite systems (RTK-GNSS) shown in FIG. 1 and a vehicle position calculating unit 48 shown in FIG. 2A. It should be noted that the antennas 46, 47 may be provided to a handrail on the top of the upper structure 5.

The antennas 46, 47 are spaced from an origin O of the vehicle body coordinate system x-y-z (described later) along x-axis, y-axis and z-axis (see FIGS. 2A to 2C) respectively at predetermined distances (i.e., Lbdx, Lbdy, Lbdz).

A signal corresponding to a GNSS radio wave received by the antennas 46, 47 is inputted to the vehicle position calculating unit 48. The vehicle position calculating unit 48 detects the current position of each of the antennas 46, 47 in a global coordinate system. It should be noted that X-Y-Z denotes the global coordinate system, XY denotes a horizontal plane, and Z denotes a vertical direction. Further, the global coordinate system, which is a coordinate system based on GNSS measurement, is defined with its origin fixed on the earth.

In contrast, the vehicle body coordinate system (described later) is a coordinate system defined with its origin O fixed in the work machine body 2 (specifically, the upper structure 5).

The antenna 46, which may be referred to as "reference antenna 46" hereinafter, is intended for detection of the current position of the work machine body 2. The antenna 47, which may be referred to as "direction antenna 47" hereinafter, is intended for detection of an orientation of the work machine body 2 (specifically, the upper structure 5). Based on the respective positions of the reference antenna 46 and the direction antenna 47, the position detector 45 detects a direction angle of the x-axis of the vehicle body coordinate (described later) in the global coordinate system. It should be noted that the antennas 46, 47 may be GPS antennas.

As shown in FIG. 2A, the work machine body 2 includes an inertial measurement unit (IMU) 49 that measures an inclination angle of the vehicle body. An angular velocity and an acceleration of each of a roll angle ($\theta 1$: see FIG. 2B) in a Y-direction and a pitch angle ($\theta 2$: see FIG. 2C) in an X-direction are outputted from the IMU 49.

The boom cylinder 34, the arm cylinder 35 and the bucket cylinder 36 are respectively provided with a boom cylinder stroke sensor 42, an arm cylinder stroke sensor 43 and a bucket cylinder stroke sensor 44 (swing angle detectors).

The cylinder stroke sensors 42 to 44 are stroke sensors respectively for detecting strokes of the cylinders of the hydraulic cylinders 34 to 36.

The cylinder stroke sensors 42 to 44 detect respective stroke lengths of the hydraulic cylinders 34 to 36 to allow an attitude calculating unit 72C of a display controller 72 (described later) to calculate a swing angle of the boom 31 relative to the work machine body 2, a swing angle of the arm 32 relative to the boom 31, and a swing angle of the bucket 33 relative to the arm 32.

It should be noted that the swing angle information may alternatively be detected by angle sensors individually attached to swingable portions of the working equipment in place of the swing angle detectors.

Specifically, based on the stroke length of the boom cylinder 34 detected by the boom cylinder stroke sensor 42, the attitude calculating unit 72C of the display controller 72 (described later) calculates a swing angle $\alpha$ of the boom 31 relative to a z-axis of a vehicle body coordinate system (described later) as shown in FIG. 2A.

Based on the stroke length of the arm cylinder 35 detected by the arm cylinder stroke sensor 43, the attitude calculating unit 72C of the display controller 72 calculates a swing angle $\beta$ of the arm 32 relative to the boom 31.

Based on the stroke length of the bucket cylinder 36 detected by the bucket cylinder stroke sensor 44, the attitude calculating unit 72C of the display controller 72 calculates a swing angle $\gamma$ of the bucket 33 relative to the arm 32. A method for calculating the swing angles $\alpha$, $\beta$, $\gamma$ will be described later.

2. Arrangement of Control System of Hydraulic Excavator 1

Figure 3:
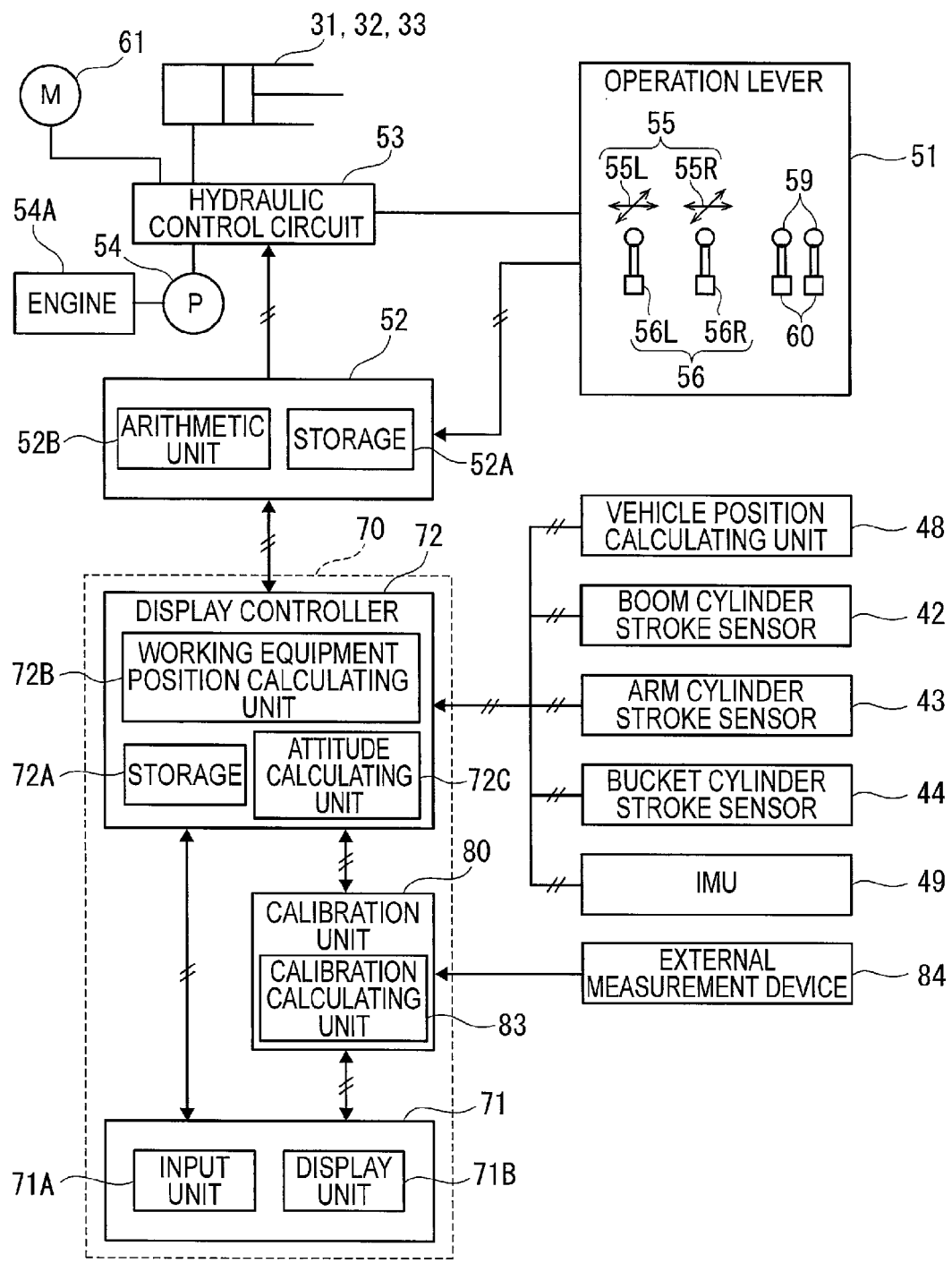
FIG. 3 is a control block diagram showing the work machine according to the exemplary embodiment.

FIG. 3 is a block diagram showing an arrangement of a control system of the hydraulic excavator 1.

The hydraulic excavator 1 includes the control device 51, a working equipment controller 52, a hydraulic control circuit 53, the hydraulic pump 54, a hydraulic motor 61, the engine 54A and a display system 70.

The control device 51 includes a working equipment operation lever 55 and a working equipment operation detecting unit 56.

The working equipment operation lever 55 includes right and left operation levers 55R, 55L. The left operation lever 55L is operated right and left to provide a command for turning the upper structure 5 right and left, and is operated back and forth to provide a dumping/excavation command to the arm 32. The right operation lever 55R is operated right and left to provide a dumping/excavation command to the bucket 33, and is operated back and forth to provide a command for vertically moving the boom 31.

Working equipment operation detecting units 56L, 56R detect the operation of the working equipment operation lever 55, and outputs the detected operation in the form of a detection signal to the working equipment controller 52. An operation command may be provided from the working equipment operation lever 55 to the hydraulic control circuit 53 in a pilot hydraulic method or in an electrical lever method. In the electrical lever method, the operation command is converted into an electrical signal through, for instance, a potentiometer and inputted to the working equipment controller 52. In the pilot hydraulic method, a proportional control valve of a hydraulic control circuit 53 (described later) is actuated with a pilot hydraulic pressure generated by a lever operation to regulate the flow rate of a hydraulic fluid. Further, a pilot pressure, which is detected by a pressure sensor, is converted into an electrical signal and inputted to the working equipment controller 52.

A travel control lever 59 is operated by an operator to drive the hydraulic excavator 1. A travel operation detecting unit 60 supplies a hydraulic pressure to the hydraulic motor 61 of the undercarriage 4 in accordance with the operation of the travel control lever 59.

The working equipment controller 52 includes a storage 52A (e.g., RAM or ROM) and an arithmetic unit 52B (e.g., CPU). The working equipment controller 52 mainly controls the movement of the working equipment 3. The working equipment controller 52 generates a control signal for moving the working equipment 3 in accordance with the operation of the working equipment operation lever 55, and outputs the control signal to the hydraulic control circuit 53.

The hydraulic control circuit 53, which includes hydraulic control equipment including a proportional control valve and an EPC valve, controls a flow rate of a hydraulic oil supplied to the hydraulic cylinders 34 to 36 from the hydraulic pump 54 based on the control signal from the working equipment controller 52.

The hydraulic cylinders 34 to 36 are actuated in accordance with the hydraulic oil supplied through the hydraulic control circuit 53 to move the working equipment 3.

When the proportional valve is actuated by the operation of a turning operation lever, the hydraulic motor 61 is driven to turn the upper structure 5. It should be noted that a rotary motor for driving the upper structure 5 may be not hydraulically but electrically driven.

The hydraulic excavator 1 includes the display system 70. The display system 70 is configured to provide an operator with information for excavating the ground in a work area into a designed landform (described later). The display system 70 includes the display input device 71, the display controller 72 and a calibration unit 80. It should be noted that the functions of the display system 70 may be provided in the form of individual controllers.

The display input device 71 includes an input unit 71A in the form of a touch panel and a display unit 71B, which may be a liquid crystal display (LCD). The display input device 71 displays a guide screen for providing the information for excavation. The guide screen may also display various keys, which are to be touched by an operator to perform the various functions of the display system 70.

The input unit 71A, which is used by an operator to input various types of information such as a measurement value, may be a keyboard or a touch panel.

The display controller 72 performs various functions of the display system 70. The display controller 72 and the working equipment controller 52 can communicate with each other through a wire or wirelessly. The display controller 72 includes a storage 72A, which may be a known device (e.g., RAM or ROM), a working equipment position calculating unit 72B (e.g., CPU) and the attitude calculating unit 72C.

The working equipment position calculating unit 72B displays the guide screen based on various types of data stored in the storage 72A and a detection result of the position detector 45 and calculates the position of the blade edge P of the bucket 33 (described later) in order to perform an excavation operation. The calculating units 72B, 72C may be provided in a controller independent of the display controller 72.

Based on detection values of the cylinder stroke sensors 42 to 44, the attitude calculating unit 72C calculates attitude angles, i.e., the swing angle α of the boom 31, the swing angle β of the arm 32 and the swing angle γ of the bucket 33, from cylinder strokes detected by the cylinder stroke sensors 42 to 44 respectively provided to the boom 31, the arm 32 and the bucket 33. The attitude calculating unit 72C calculates a roll angle θ1 and a pitch angle θ2 of the hydraulic excavator 1 using the IMU 49.

Designed landform data is created in advance and stored in the storage 72A of the display controller 72. The designed landform data is information regarding a three-dimensional designed landform and the position thereof. The designed landform shows a target form of the ground to be excavated. The display controller 72 displays the guide screen on the display input device 71 based on the designed landform data and data such as the detection results of the various sensors.

The storage 72A also stores a working equipment parameter.

3. Method for Calculating Position of Blade Edge P of Bucket 33

Next, the method for calculating the position of the blade edge P of the bucket 33 will be described in detail. The attitude calculating unit 72C of the display controller 72 calculates an estimated position of the blade edge P of the bucket 33 based on the detection results of the position detector 45 and a plurality of parameters stored in the storage 72A.

The parameters include the working equipment parameter and an antenna parameter. The working equipment parameter includes a plurality of parameters indicating the respective dimensions and swing angles of the boom 31, the arm 32 and the bucket 33. The antenna parameter includes a plurality of parameters indicating a positional relationship between each of the antennas 46, 47 and the boom 31.

As shown in FIG. 3, the working equipment position calculating unit 72B of the display controller 72 calculates an estimated position of the blade edge P of the bucket 33 in the global coordinate system from: the respective estimated positions of the antennas 46, 47 in the global coordinate system detected by the position detector 45; and the calculated estimated position of the blade edge P of the bucket 33 in the vehicle body coordinate system. Specifically, the estimated position of the blade edge P of the bucket 33 is calculated as follows.

First, as shown in FIGS. 2A to 2C, the vehicle body coordinate system x-y-z is defined with its origin O at a rotation center of the upper structure 5. It should be noted that the x-axis of the vehicle body coordinate system corresponds to a front-and-rear direction of the vehicle body, the y-axis corresponds to a right-and-left direction of the vehicle body, and the z-axis corresponds to a vertical direction of the vehicle body.

The boom pin 37 is defined as a reference position of the hydraulic excavator 1 hereinbelow. The position of the boom pin 37 (i.e., a position of a midpoint of the boom pin 37 in a vehicle-width direction) is actually defined as the coordinates of the position of the boom pin 37 in the vehicle body coordinate system. The reference position of the hydraulic excavator 1 may be anywhere on the upper structure 5.

Based on the detection results of the cylinder stroke sensors 42, 43, 44, the current swing angles $\alpha$, $\beta$, $\gamma$ of the boom 31, the arm 32 and the bucket 33 are calculated.

The coordinates (x, y, z) of the blade edge P of the bucket 33 in the vehicle body coordinate system are calculated from the swing angles $\alpha$, $\beta$, $\gamma$ of the boom 31, the arm 32 and the bucket 33 and lengths L1, L2, L3 of the boom 31, the arm 32 and the bucket 33 (working equipment parameters) by the following equations (1).

Equation 1

$$x = L1 \sin\alpha + L2 \sin(\alpha+\beta) + L3 \sin(\alpha+\beta+\gamma)$$

$$y = 0$$

$$z = L1 \cos\alpha + L2 \cos(\alpha+\beta) + L3 \cos(\alpha+\beta+\gamma) \quad (1)$$

The coordinates (x, y, z) of the blade edge P of the bucket 33 in the vehicle body coordinate system calculated by the equations (1) are converted into coordinates (X, Y, Z) in the global coordinate system by the following equation (2).

Equation 2

$$\begin{pmatrix} X \\ Y \\ Z \end{pmatrix} = \begin{pmatrix} \cos\kappa\cos\varphi & \cos\kappa\sin\varphi\sin\omega + \sin\kappa\cos\omega & -\cos\kappa\sin\varphi\cos\omega + \sin\kappa\sin\omega \\ -\sin\kappa\cos\varphi & -\sin\kappa\sin\varphi\sin\omega + \cos\kappa\cos\omega & \sin\kappa\sin\varphi\cos\omega + \cos\kappa\sin\omega \\ \sin\varphi & -\cos\varphi\sin\omega & \cos\varphi\cos\omega \end{pmatrix} \begin{pmatrix} x \\ y \\ z \end{pmatrix} + \begin{pmatrix} A \\ B \\ C \end{pmatrix} \quad (2)$$

In the above equation, $\omega$, $\varphi$ and $\kappa$ are represented by the following equations (3).

Equation 3

$$\omega = \arcsin\left(\frac{\sin\theta 1}{\cos\varphi}\right) \quad (3)$$

$$\varphi = \theta 2$$

$$\kappa = -\theta 3$$

In the above equations, θ1 represents the roll angle as described above. θ2 represents the pitch angle. As shown in FIG. 2C, θ3 represents the yaw angle, which corresponds to the direction angle of the x-axis of the vehicle body coordinate system in the global coordinate system. The yaw angle θ3 is thus calculated based on the respective positions of the reference antenna 46 and the direction antenna 47 detected by the position detector 45. (A, B, C) represents the coordinates of the origin of the vehicle body coordinate system in the global coordinate system.

The antenna parameter indicates a positional relationship between each of the antennas 46, 47 and the origin of the vehicle body coordinate system (i.e., a positional relationship between each of the antennas 46, 47 and the midpoint of the boom pin 37 in the vehicle-width direction).

Specifically, as shown in FIGS. 2B and 2C, the antenna parameter includes: a distance Lbbx between the boom pin 37 and the reference antenna 46 in an x-axis direction in the vehicle body coordinate system; a distance Lbby between the boom pin 37 and the reference antenna 46 in a y-axis direction in the vehicle body coordinate system; and a distance Lbbz between the boom pin 37 and the reference antenna 46 in a z-axis direction in vehicle body coordinate system. In addition, the antenna parameter includes: a distance Lbdx between the boom pin 37 and the direction antenna 47 in the x-axis direction in the vehicle body coordinate system; a distance Lbdy between the boom pin 37 and the direction antenna 47 in the y-axis direction in the vehicle body coordinate system; and a distance Lbdz between the boom pin 37 and the direction antenna 47 in the z-axis direction in vehicle body coordinate system.

(A, B, C) is calculated based on the respective coordinates of the antennas 46, 47 in the global coordinate system detected by the antennas 46, 47 and the antenna parameter.

The display controller 72 calculates a distance between the three-dimensional designed landform and the blade edge P of the bucket 33 based on the current position of the blade edge P of the bucket 33 calculated as described above and the designed landform data stored in the storage 72A. The calculated distance may be displayed on the display unit 71B and/or may be used as a parameter for excavation control.

Next, description will be made on a method for calculating the current swing angles $\alpha$, $\beta$, $\gamma$ of the boom 31, the arm 32 and the bucket 33 based on the detection results of the cylinder stroke sensors 42, 43, 44.

Figure 4:
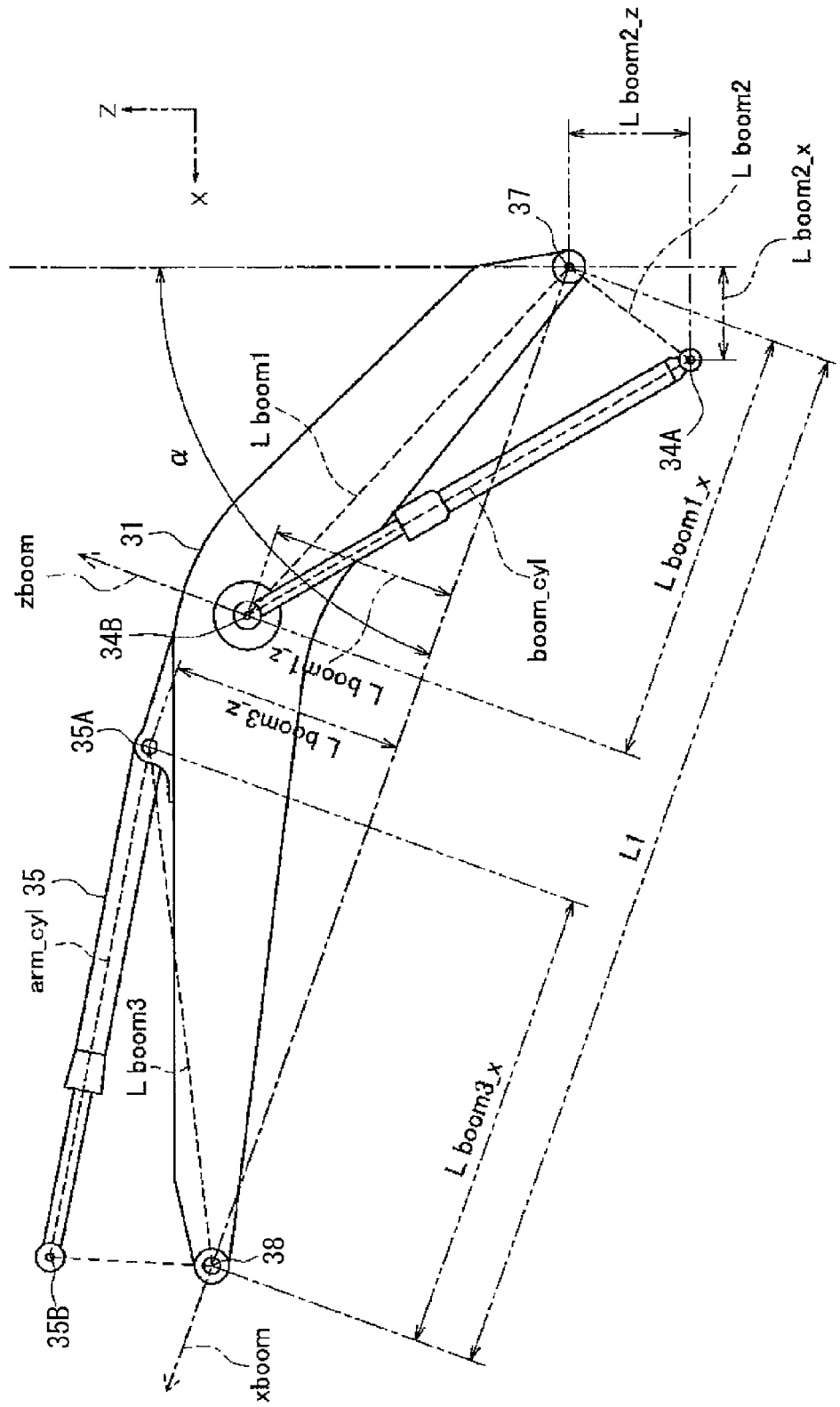
FIG. 4 is a side view showing a boom of the work machine according to the exemplary embodiment.

FIG. 4 is a side view showing the boom 31. The swing angle $\alpha$ of the boom 31 is represented by the following equation (4) using the working equipment parameters shown in FIG. 4.

Equation 4

$$\alpha = \pi - \arctan\left(\frac{Lboom2\_x}{Lboom2\_z}\right) - \arccos\left(\frac{Lboom1^2 + Lboom2^2 - boom\_cyl^2}{2*Lboom1*Lboom2}\right) + \arctan\left(\frac{Lboom1\_z}{Lboom1\_x}\right) \quad (4)$$

As shown in FIG. 4, Lboom2_x (a working equipment parameter of the boom 31) represents a distance between the boom cylinder foot pin 34A and the boom pin 37 in a horizontal direction of the work machine body 2 where the boom 31 is attached (corresponding to the x-axis direction in the vehicle body coordinate system). Lboom2_z (a working equipment parameter of the boom 31) represents a distance between the boom cylinder foot pin 34A and the boom pin 37 in a vertical direction of the work machine body 2 where the boom 31 is attached (corresponding to the z-axis direction in the vehicle body coordinate system). Lboom1 (a working equipment parameter of the boom 31) represents a distance between the boom cylinder top pin 34B and the boom pin 37. Lboom2 (a working equipment parameter of the boom 31) represents a distance between the boom cylinder foot pin 34A and the boom pin 37. boom_cyl (a working equipment parameter of the boom 31) represents a distance between the boom cylinder foot pin 34A and the boom cylinder top pin 34B. Lboom1 (a working equipment parameter of the boom 31) represents a distance between the boom cylinder top pin 34B and the boom pin 37 in a zboom-axial direction. It should be noted that a direction connecting the boom pin 37 and the arm pin 38 in a side view is defined as an xboom axis, and a direction perpendicular to the xboom axis is defined as a zboom axis. Lboom1_x (a working equipment parameter of the boom 31) represents a distance between the boom cylinder top pin 34B and the boom pin 37 in an xboom-axial direction.

Figure 5:
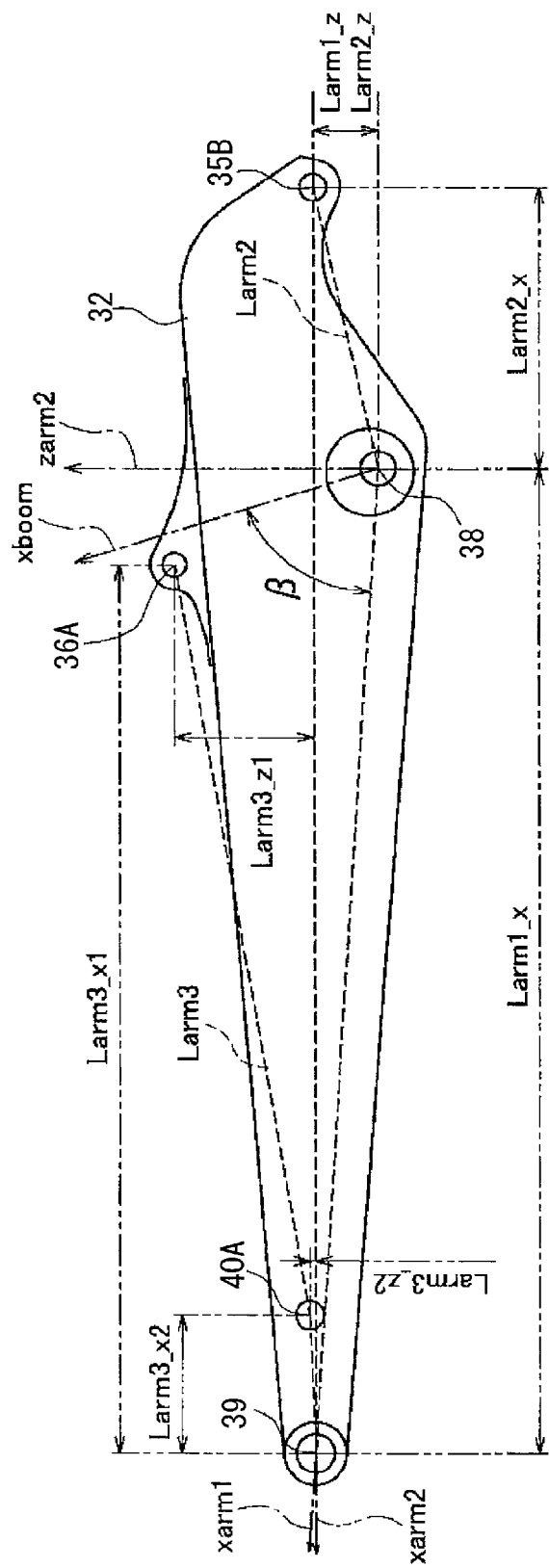
FIG. 5 is a side view showing an arm of the work machine according to the exemplary embodiment.

FIG. 5 is a side view showing the arm 32. The swing angle β of the arm 32 is represented by the following equation (5) using the working equipment parameters shown in FIGS. 4 and 5.

Equation 5

$$\beta = \arctan\left(\frac{Lboom3\_z}{Lboom3\_x}\right) + \arccos\left(\frac{Lboom3^2 + Larm2^2 - arm\_cyl^2}{2*Lboom3*Larm2}\right) + \arctan\left(\frac{Larm2\_x}{Larm2\_z}\right) + \arctan\left(\frac{Larm1\_x}{Larm1\_z}\right) - \pi \quad (5)$$

As shown in FIG. 4, Lboom3_z (a working equipment parameter of the boom 31) represents a distance between the arm cylinder foot pin 35A and the arm pin 38 in the zboom-axial direction. Lboom3_x (a working equipment parameter of the boom 31) represents a distance between the arm cylinder foot pin 35A and the arm pin 38 in the xboom-axial direction. Lboom3 (a working equipment parameter of the boom 31) represents a distance between the arm cylinder foot pin 35A and the arm pin 38. As shown in FIG. 5, Larm2 (a working equipment parameter of the arm 32) represents a distance between the arm cylinder top pin 35B and the arm pin 38. As shown in FIG. 4, arm_cyl (a working equipment parameter of the arm 32) represents a distance between the arm cylinder foot pin 35A and the arm cylinder top pin 35B.

As shown in FIG. 5, Larm2_x (a working equipment parameter of the arm 32) represents a distance between the arm cylinder top pin 35B and the arm pin 38 in an xarm2-axial direction. Larm2_z (a working equipment parameter of the arm 32) represents a distance between the arm cylinder top pin 35B and the arm pin 38 in a zarm2-axial direction.

It should be noted that a direction connecting the arm cylinder top pin 35B and the bucket pin 39 in a side view is defined as an xarm2 axis, and a direction perpendicular to the xarm2 axis is defined as a zarm2 axis. Larm1_x (a working equipment parameter of the arm 32) represents a distance between the arm pin 38 and the bucket pin 39 in the xarm2-axial direction. Larm1_z (a working equipment parameter of the arm 32) represents a distance between the arm pin 38 and the bucket pin 39 in the zarm2-axial direction. Further, a direction connecting the arm pin 38 and the bucket pin 39 in a side view is defined as an xarm1 axis. The swing angle β of the arm 32 is an angle between the xboom axis and the xarm1 axis.

Figure 6:
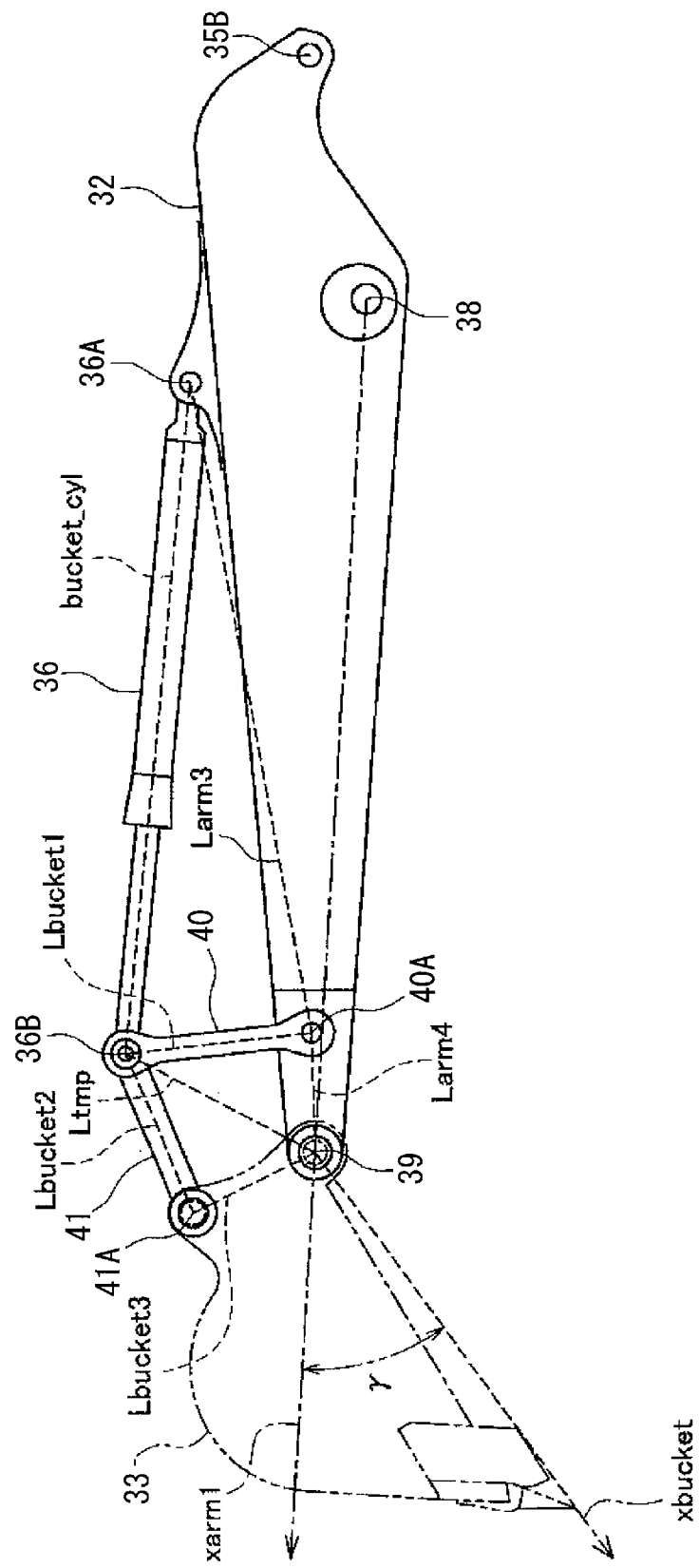
FIG. 6 is a side view showing the arm and bucket of the work machine according to the exemplary embodiment.
Figure 7:
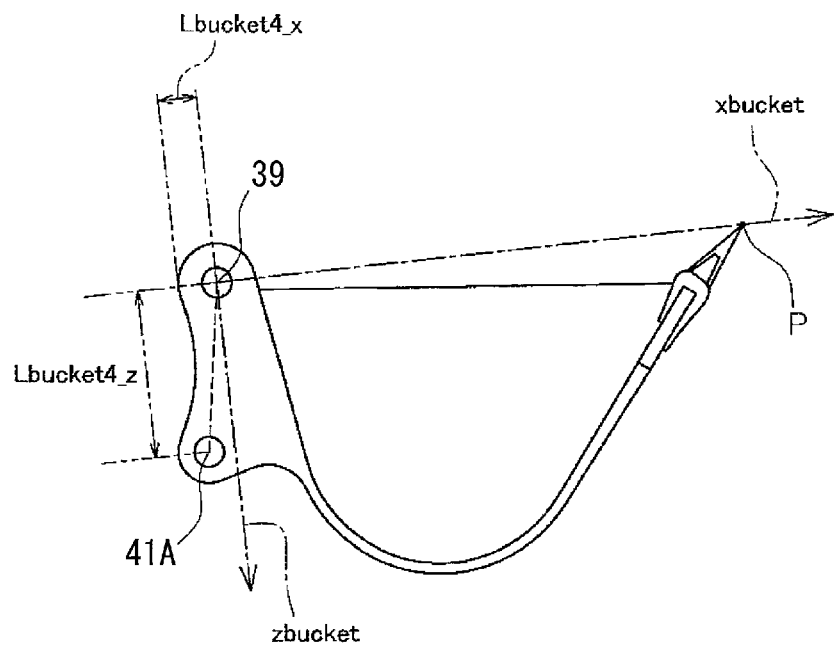
FIG. 7 is a side view showing the bucket of the work machine according to the exemplary embodiment.

FIG. 6 is a side view showing the bucket 33 and the arm 32. FIG. 7 is a side view showing the bucket 33. The swing angle γ of the bucket 33 is represented by the following equation (6) using the working equipment parameters shown in FIGS. 4 to 7.

Equation 6

$$\gamma = \arctan\left(\frac{Larm1\_z}{Larm1\_x}\right) + \arctan\left(\frac{Larm3\_z2}{Larm3\_x2}\right) + \arccos\left(\frac{Ltmp^2 + Larm4^2 - Lbucket1^2}{2*Ltmp*Larm4}\right) + \arccos\left(\frac{Ltmp^2 + Lbucket3^2 - Lbucket2^2}{2*Ltmp*Lbucket3}\right) + \arctan\left(\frac{Lbucket4\_x}{Lbucket4\_z}\right) + \frac{\pi}{2} - \pi \quad (6)$$

As shown in FIG. 5, Larm3_z2 (a working equipment parameter of the arm 32) represents a distance between the first link pin 40A and the bucket pin 39 in the zarm2-axial direction. Larm3_x2 (a working equipment parameter of the arm 32) represents a distance between the first link pin 40A and the bucket pin 39 in the xarm2-axial direction.

As shown in FIG. 6, Ltmp (a working equipment parameter of the arm 32) represents a distance between the bucket cylinder top pin 36B and the bucket pin 39. Larm4 (a working equipment parameter of the arm 32) represents a distance between the first link pin 40A and the bucket pin 39. Lbucket1 (a working equipment parameter of the bucket 33) represents a distance between the bucket cylinder top pin 36B and the first link pin 40A. Lbucket3 (a working equipment parameter of the bucket 33) represents a distance between the bucket pin 39 and the second link pin 41A. Lbucket2 (a working equipment parameter of the bucket 33) represents a distance between the bucket cylinder top pin 36B and the second link pin 41A.

As shown in FIG. 7, Lbucket4_x (a working equipment parameter of the bucket 33) represents a distance between the bucket pin 39 and the second link pin 41A in an xbucket-axial direction. Lbucket4_z (a working equipment parameter of the bucket 33) represents a distance between the bucket pin 39 and the second link pin 41A in a zbucket-axial direction.

It should be noted that a direction connecting the bucket pin 39 and the blade edge P of the bucket 33 in a side view is defined as an xbucket axis, and a direction perpendicular to the xbucket axis is defined as a zbucket axis. The swing angle γ of the bucket 33 is an angle between the xbucket axis and the xarm1 axis. Ltmp described above is represented by the following equation (7).

Equation 7

$$Ltmp = \sqrt{Larm4^2 + Lbucket1^2 - 2Larm4*Lbucket1*\cos\phi} \quad (7)$$

$$\phi = \pi + \sqrt{\frac{Larm3\_z2}{Larm3\_x2}} - \sqrt{\frac{Larm3\_z1 - Larm3\_z2}{Larm3\_x1 - Larm3\_x2}} - \arccos\left\{\frac{Lbucket1^2 + Larm3^2 - bucket\_cyl^2}{2*Lbucket1*Larm3}\right\}$$

Figure 8:
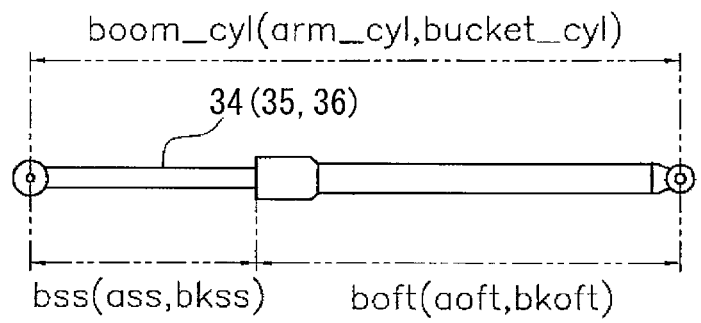
FIG. 8 is a side view showing a cylinder of the work machine according to the exemplary embodiment.

As shown in FIG. 6, Larm3 (a working equipment parameter of the arm 32) represents a distance between the bucket cylinder foot pin 36A and the first link pin 40A. Larm3_x1 (a working equipment parameter of the arm 32) represents a distance between the bucket cylinder foot pin 36A and the bucket pin 39 in the xarm2-axial direction. Larm3_z1 (a working equipment parameter of the arm 32) represents a distance between the bucket cylinder foot pin 36A and the bucket pin 39 in the zarm2-axial direction.

boom_cyl described above is a value obtained by adding a boom cylinder offset working parameter boft (a working equipment parameter of the boom 31) to a stroke length bss of the boom cylinder 34 detected by the boom cylinder stroke sensor 42, as shown in FIG. 8.

Similarly, arm_cyl is a value obtained by adding an arm cylinder offset working equipment parameter aoft (a working equipment parameter of the arm 32) to a stroke length as of the arm cylinder 35 detected by the arm cylinder stroke sensor 43.

Similarly, bucket_cyl is a value obtained by adding a bucket cylinder offset working equipment parameter bkoft (a working equipment parameter of the bucket 33 including a minimum distance of the bucket cylinder 36) to a stroke length bkss of the bucket cylinder 36 detected by the bucket cylinder stroke sensor 44.

4. Arrangement of Calibration Unit 80

The calibration unit 80 shown in FIG. 3 is a unit for calibrating the working equipment parameter(s) necessary for calculating the swing angles $\alpha$, $\beta$, $\gamma$ and the position of the blade edge P of the bucket 33 in the hydraulic excavator 1.

The calibration unit 80, which includes a calibration calculating unit 83, defines a calibration device for calibrating the working equipment parameter(s) in combination with the hydraulic excavator 1 and an external measurement device 84. The external measurement device 84 is a device for measuring the position of the blade edge P of the bucket 33, and may be a total station. The calibration unit 80 is capable of data communication with the display controller 72 through an in-vehicle communication.

The calibration unit 80 includes a measurement value acquiring unit 83A (described later), which is capable of data communication with the external measurement device 84 through the in-vehicle communication.

The calibration calculating unit 83, which may be a CPU, calibrates the working equipment parameter(s) based on a measurement value measured by the external measurement device 84. The calibration of the working equipment parameter(s) may be performed before shipment of the hydraulic excavator 1 or after maintenance.

A calibration result of the work parameter(s) is displayed on the display unit 71B of the display input device 71 to show whether the calibration is successfully performed or another calibration needs to be performed.

Figure 9:
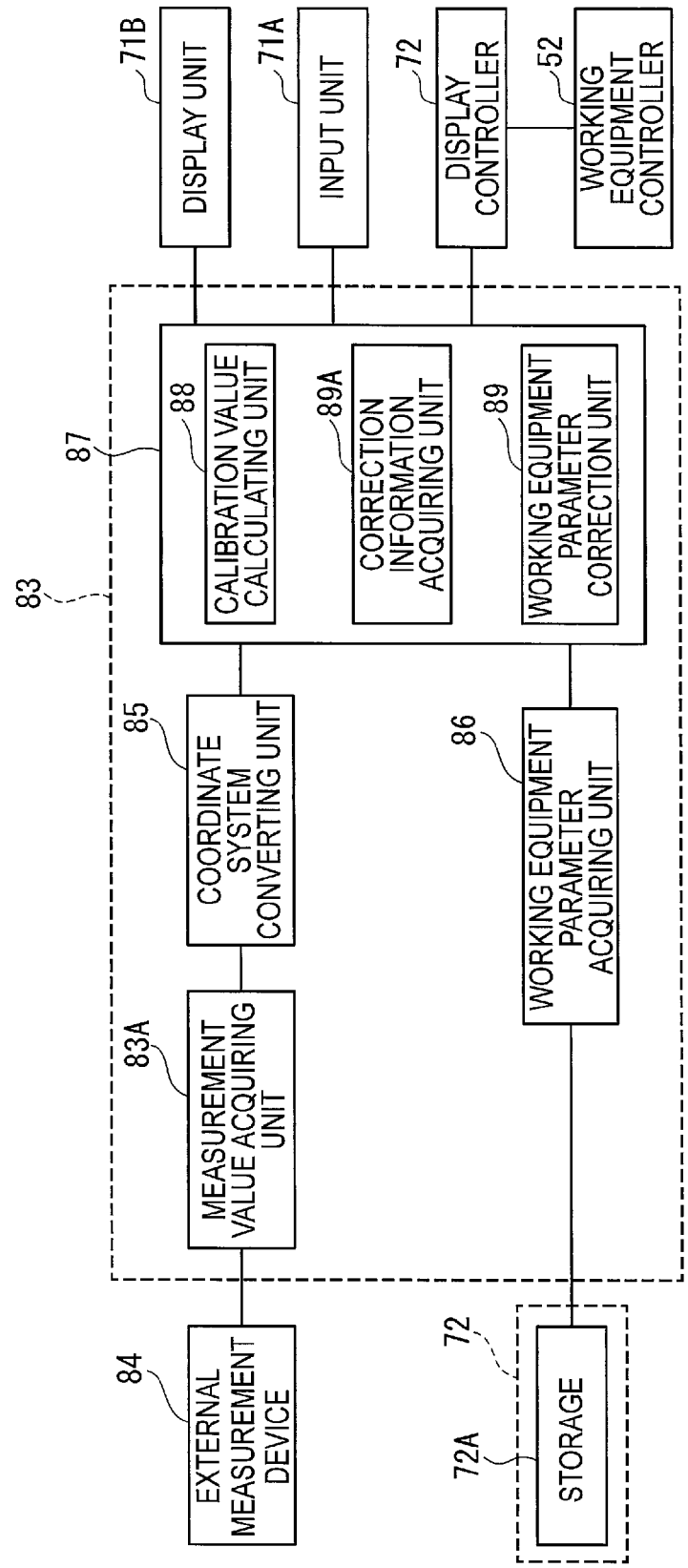
FIG. 9 is a functional block diagram showing a calibration unit in the work machine according to the exemplary embodiment.

Specifically, as shown in a functional block diagram of FIG. 9, the calibration calculating unit 83 includes the measurement value acquiring unit 83A, a coordinate system converting unit 85, a working equipment parameter acquiring unit 86 and a parameter calibration unit 87.

The coordinate system converting unit 85 is a unit for converting the measurement value measured by the external measurement device 84 into a value according to the vehicle body coordinate system. Specifically, after being converted into the value according to the vehicle body coordinate system (the specific conversion process into the value according to the vehicle body coordinate system will be omitted), the measurement value is outputted to the parameter calibration unit 87.

The working equipment parameter acquiring unit 86 is a unit for reading a default value of the working equipment parameter(s) stored in the storage 72A of the display controller 72, and the read value of the working equipment parameter(s) is outputted to the parameter calibration unit 87. It should be noted that the default value of the working equipment parameter(s) may be selected from among the value shown in the figure(s), a value obtained by, for instance, dimensional measurement, and a previous calibration value, as needed.

The parameter calibration unit 87 is a unit for calibrating the default value of the working equipment parameter(s) outputted from the working equipment parameter acquiring unit 86 based on the measurement value, which has been converted into the value according to the vehicle body coordinate system by the coordinate system converting unit 85. The parameter calibration unit 87 includes a calibration value calculating unit 88, a correction information acquiring unit 89A and a working equipment parameter correction unit 89.

Initially, the calibration value calculating unit 88 calculates, using known convergence calculations and the like, the working equipment parameters for the boom 31, the arm 32 and the bucket 33 for the position of the bucket pin 39 at a predetermined attitude of the hydraulic excavator 1 based on the measurement values acquired from the external measurement device 84 and the attitude at that time calculated by the attitude calculating unit 72C.

The correction information acquiring unit 89A acquires correction information inputted by an operator through the input unit 71A and outputs the correction information to the working equipment parameter correction unit 89.

Figure 10:
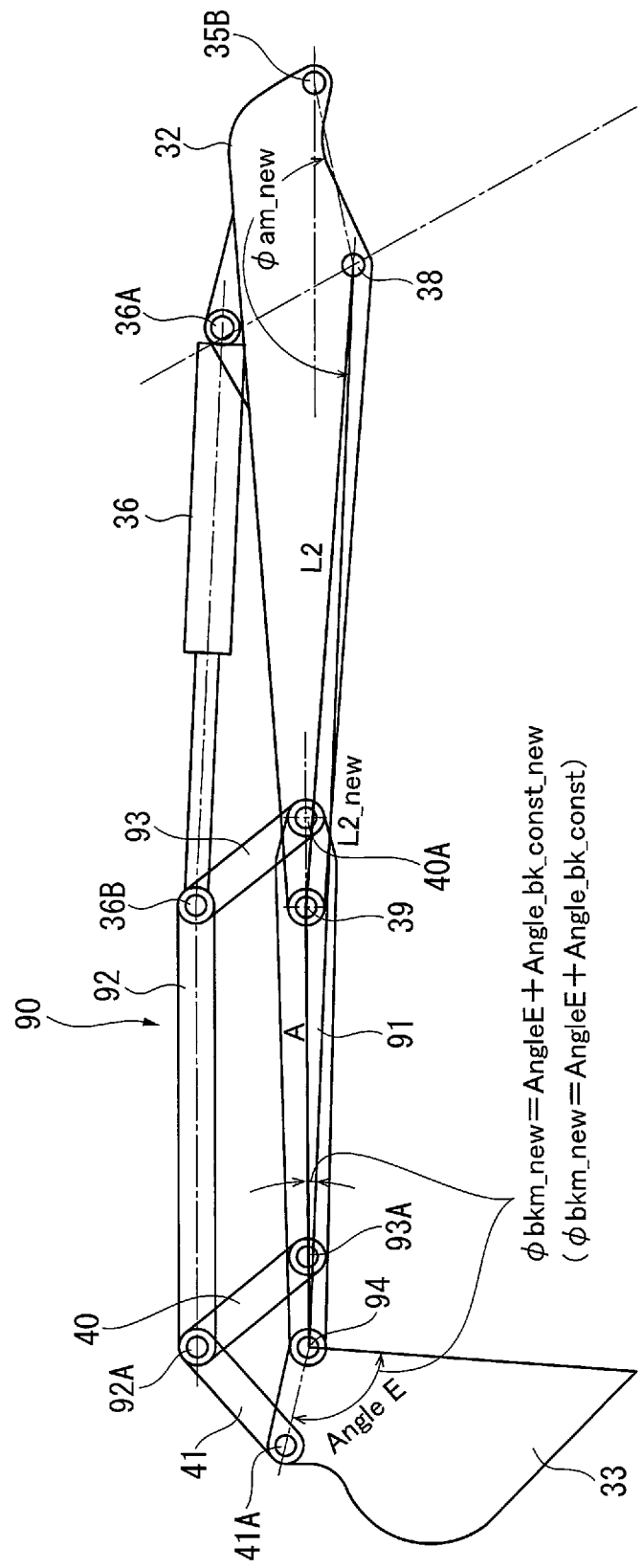
FIG. 10 is a side view showing an arm attached with an extension arm according to the exemplary embodiment.
Figure 11:
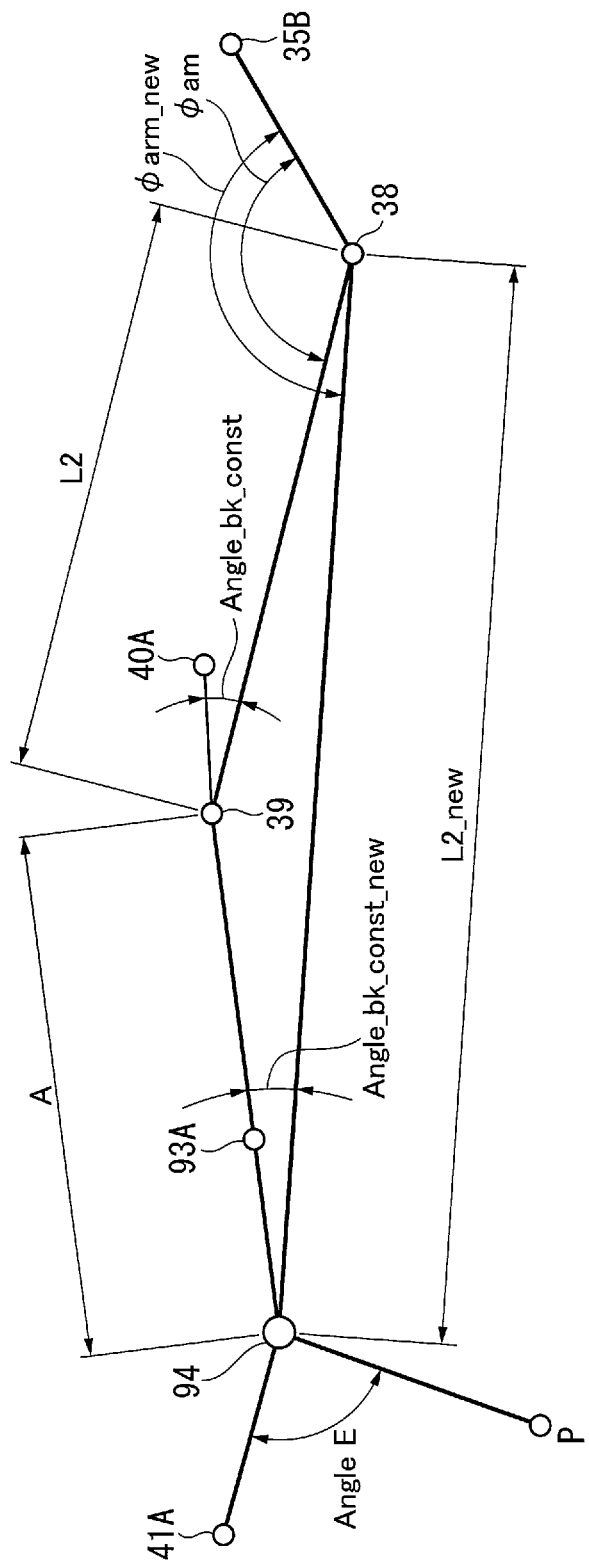
FIG. 11 is a schematic view for explaining an angular relationship of the extension arm before and after correction according to the exemplary embodiment.

The working equipment parameter correction unit 89 is a unit configured to correct the working equipment parameters when an extension arm 90 (second working equipment) is attached to the arm 32 as shown in FIG. 10. FIG. 11 is a schematic illustration of FIG. 10 showing an angular relationship of the components when the extension arm 90 is attached.

The extension arm 90 includes an elongation arm 91, an extension rod 92 and a third link member 93.

The elongation arm 91 is swingably attached to the bucket pin 39 of the arm 32.

The extension rod 92 is swingably attached to the bucket cylinder top pin 36B of the bucket cylinder 36.

A first end of the third link member 93 is swingably attached to a third link pin 93A provided to a middle part of the elongation arm 91. A second end of the third link member 93 is swingably attached to a fourth link pin 92A provided at a distal end of the extension rod 92.

The elongation arm 91, the first link member 40, the extension rod 92 and the third link member 93 define a parallel link mechanism.

The bucket 33 is swingably attached to the second bucket pin 94 at an end of the elongation arm 91.

Figure 12:
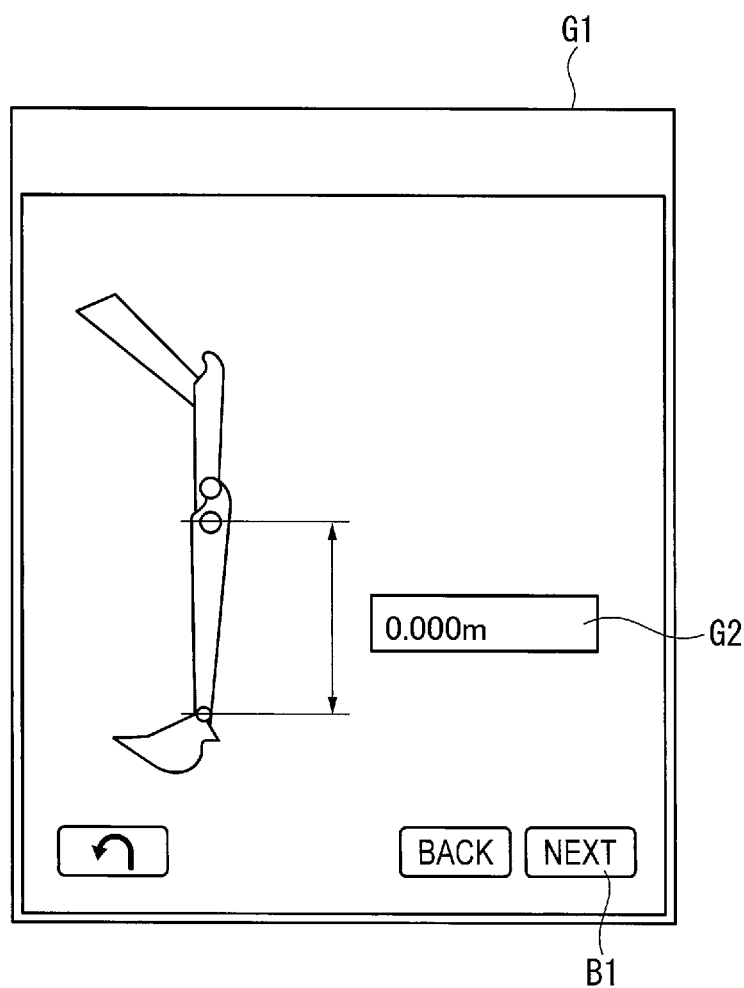
FIG. 12 is a schematic view showing a screen image for inputting an arm length when the extension arm is attached according to the exemplary embodiment.

When the extension arm 90 shown in FIG. 10 is attached to the hydraulic excavator 1, the correction information acquiring unit 89A displays a setup image G1 as shown in FIG. 12 in response to an operation on the input unit 71A by an operator. The operator operates the numeric keys of the input unit 71A to input the distance between the bucket pin 39 and the second bucket pin 94 of the attached extension arm 90 as the length of the extension arm 90 based on the dimensions in the drawing on an input image G2 shown in FIG. 12.

The correction information acquiring unit 89A acquires correction information of the extension arm 90 inputted through the input unit 71A and outputs the correction information to the working equipment parameter correction unit 89.

The working equipment parameter correction unit 89 corrects the working equipment parameters into the working equipment parameters after the extension arm 90 is attached based on the correction information of the extension arm 90 acquired by the correction information acquiring unit 89A.

Specifically, as shown in FIG. 11, the dimension of each of the components after the extension arm 90 is attached is shown, an angle defined by a line segment connecting the second bucket pin 94 and the second link pin 41A and a line segment connecting the second bucket pin 94 and the blade edge P is AngleE, an angle defined by a line segment connecting the arm pin 38 and the bucket pin 39 and a line segment connecting the bucket pin 39 and the first link pin 40A is Angle_bk_const, an angle defined before correction by a line segment connecting the arm pin 38 and the bucket pin 39 and a line segment connecting the arm pin 38 and the arm cylinder top pin 35B is φam, and an angle defined by the bucket 33 and the arm 32 is φbkm. Further, an angle defined after correction by a line segment connecting the arm pin 38 and the second bucket pin 94 and a line segment connecting the arm pin 38 and the arm cylinder top pin 35B is φarm_new, and an angle defined by the bucket 33 and the elongation arm 91 (correction information) is φbkm_new. The φbkm_new is a sum of AngleE and Angle_bk_const_new. The corrected working equipment parameter can be corrected according to equations (8) to (11) below.

L2_new: corrected arm length

φarm_new: an angle defined by a line segment connecting the arm pin 38 and the second bucket pin 94, and a line segment connecting the arm pin 38 and the arm cylinder top pin 35B when the extension arm 90 is attached φbkm_new: a sum of AngleE and Angle_bk_const_new Angle_bk_cost_new: an angle defined by a line segment connecting the arm pin 38 and the second bucket pin 94 and a line segment connecting the bucket pin 39 and the second bucket pin 94

L2: a normal arm length

φam: an angle defined by a line segment connecting the arm pin 38 and the bucket pin 39, and a line segment connecting the arm pin 38 and the arm cylinder top pin 35B φbkm: an angle defined by the bucket 33 and the arm 32

A: a length of the elongation arm 91 of the extension arm 90

Equation 8

$$L2\_new = \sqrt{L2^2 + A^2 - 2L2 A \cos\left(\pi - Angle\_bk\_const \times \frac{\pi}{180}\right)} \quad (8)$$

Equation 9

$$\phi arm\_new = \phi am + \arccos\left(\frac{L2\_new^2 + L2^2 - A^2}{2 L2\_new L2}\right) \times \frac{180}{\pi} \quad (9)$$

Equation 10

$$\phi bkm\_new = \phi bkm - \arccos\left(\frac{L2\_new^2 + L2^2 - A^2}{2 L2\_new L2}\right) \times \frac{180}{\pi} \quad (10)$$

Equation 11

$$Angle\_bk\_const\_new = Angle\_bk\_const - \arccos\left(\frac{L2\_new^2 + L2^2 - A^2}{2 L2\_new L2}\right) \times \frac{180}{\pi} \quad (11)$$

Based on the equations (8) to (11), the working equipment parameter correction unit 89 corrects the arm length L2, the swing angle β of the arm 32 and the swing angle γ of the bucket 33, calculates the corrected parameters after the extension arm 90 is attached, and outputs the corrected working equipment parameter to the display controller 72.

The display controller 72 performs an attitude calculation and estimated position calculation based on the corrected working equipment parameter and displays on the display unit 71B the position of the blade edge P of the bucket 33 after the extension arm 90 is attached.

Further, the display controller 72 outputs the corrected working equipment parameters to the working equipment controller 52. The working equipment controller 52 controls the hydraulic cylinders 34 to 36 based on the premise that the extension arm 90 is attached.

The working equipment parameter correction unit 89 stores the normal working equipment parameters in a storage (e.g. a memory). When the extension arm 90 is removed and the hydraulic excavator 1 is restored to a normal condition, the operator inputs "0" on the setup image G1 shown in FIG. 12. Though the extension length is inputted in this exemplary embodiment, the extension length may alternatively be stored in advance and the stored extension length may be retrieved in accordance with whether or not the extension arm 90 is attached. Then, the working equipment parameter correction unit 89 judges that the extension arm 90 is removed, retrieve the normal working equipment parameters from the memory, and outputs the working equipment parameters to the display controller 72. The display controller 72 again controls the display to display the screen based on the normal working equipment parameters.

5. Function(s) and Effect(s) of First Exemplary Embodiment

Figure 13:
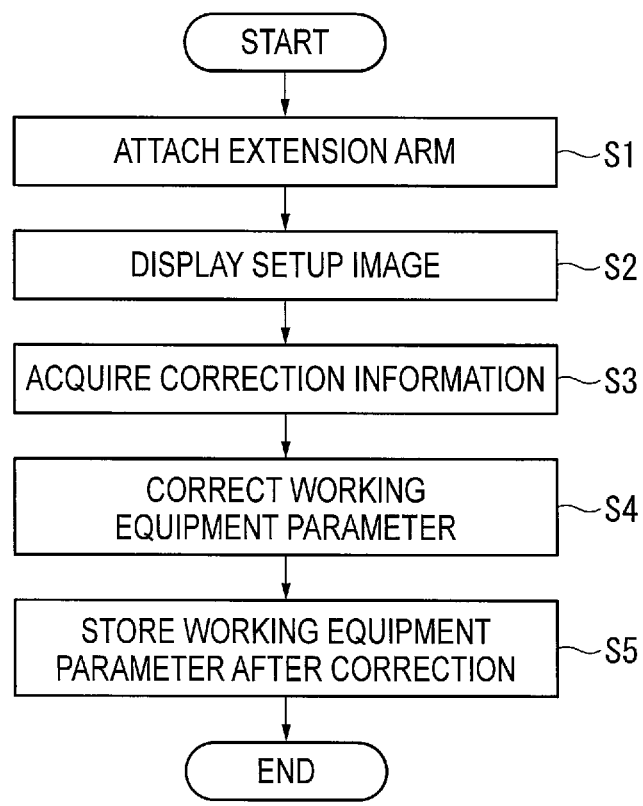
FIG. 13 is a flow chart for explaining functions of the exemplary embodiment.

Next, description will be made on the functions of the above-described exemplary embodiment with reference to a flow chart of FIG. 13.

When the operator attaches the extension arm 90 (step S1) and operates the input unit 71A, the correction information acquiring unit 89A displays the setup image G1 on the display unit 71B to prompt the operator to input the length of the extension arm 90 (i.e. the correction information) (step S2).

When the operator inputs the length of the extension arm 90 in the input unit G2, the correction information acquiring unit 89A acquires the inputted correction information (step S3), and outputs the acquired correction information to the working equipment parameter correction unit 89. The working equipment parameter correction unit 89 corrects the working equipment parameters based on the above-described equations (8) to (11) (step S4).

The working equipment parameter correction unit 89 stores the new corrected working equipment parameters in addition to the pre-corrected working equipment parameters (step S5).

According to the first exemplary embodiment, since the calibration unit 80 includes the working equipment parameter correction unit 89 and corrects the working equipment parameters using the equations (8) to (11), it is not necessary to again perform the calibration process when the extension arm 90 is attached, so that the calibration process can be simplified. The dimension of the extension arm may be stored in the storage 72A in advance, and the dimension of the extension arm may be retrieved in response to an input operation on the input unit 71A indicating that the extension arm is attached.

Since the working equipment parameter correction unit 89 stores the working equipment parameters in the normal state in the memory and the like, when the extension arm 90 is removed to be restored to the working equipment in the normal state, the stored working equipment parameter can be used. Accordingly, the calibration of the working equipment parameters at the time of restoration to the normal state becomes unnecessary.

Further, since the display controller 72 outputs the working equipment parameters corrected by the working equipment parameter correction unit 89 to the working equipment controller 52, when the extension arm 90 is attached, the working equipment 3 can be controlled based on the premise that the extension arm 90 is attached.

Second Exemplary Embodiment

Next, a second exemplary embodiment of the invention will be described below. It should be noted that the explanation for the same components as those described above will be omitted below.

In the above-described first exemplary embodiment, the attitude of the working equipment 3 is calculated by detecting the swing angle α of the boom 31 with respect to the work machine body 2, the swing angle β of the arm 32 with respect to the boom 31, and the swing angle γ of the bucket 33 with respect to the arm 32 using the cylinder stroke sensors 42 to 44.

In contrast, the second exemplary embodiment differs from the first exemplary embodiment in that an inclination sensor is used to calculate the attitude of the working equipment.

In the second exemplary embodiment, a below-described inclination sensor 100 (see FIG. 17) is used as a swing angle detector. The working equipment parameters include a length L1 of the boom 31, a length L2 of the arm 32, a length L3 of the bucket, the swing angle α of the boom 31, the swing angle β of the arm 32, and the swing angle γ of the bucket 33.

The inclination sensor 100 is disposed on the arm 32 at an angle of θ4 with respect to a line segment L2 connecting the arm pin 38 and the bucket pin 39 situated along a vertical direction. The attitude of the arm 32 is calculated based on the detection value of the inclination sensor 100.

Specifically, the functional block diagram and the like of the second exemplary embodiment are the same as those in the first exemplary embodiment, where the swing angles of the boom 31, the arm 32, and the bucket 33 with respect to the horizontal or vertical direction are calculated based on the detection value of the inclination sensor 100. Then, based on the calculated swing angles and the working equipment parameters for the boom 31, the arm 32, and the bucket 33, the position of the blade edge P of the bucket 33 is estimated and displayed on the display unit 71B.

The calibration of the inclination sensor 100 is as follows.

Initially, the distance between the boom pin 37 and the arm pin 38, the distance between the arm pin 38 and the bucket pin 39, and the distance between the bucket pin 39 and the blade edge P of the bucket 33 are actually measured using a steel tape measure and the like.

Figure 14:
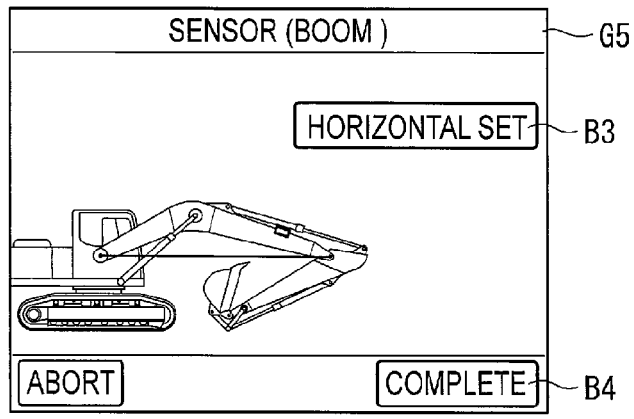
FIG. 14 is a schematic view showing a screen image for calibrating an inclination sensor according to the exemplary embodiment.

Next, the operator operates the display input device 71 in the cab 6 to display a calibration image G5 as shown in FIG. 14. The attitude of the working equipment 3 is adjusted, while measuring using an external measurement device, so that a line segment connecting the boom pin 37 and the arm pin 38 is horizontally arranged. Subsequently, while the line segment connecting the boom pin 37 and the arm pin 38 is kept horizontal by operating the boom 31, a horizontal set button B3 in the calibration image G5 is pressed. Then, the attitude calculating unit 72C sets the inclination angle detected by the inclination sensor 100 provided to the boom 31 as a value when the boom 31 is horizontally situated.

Figure 15:
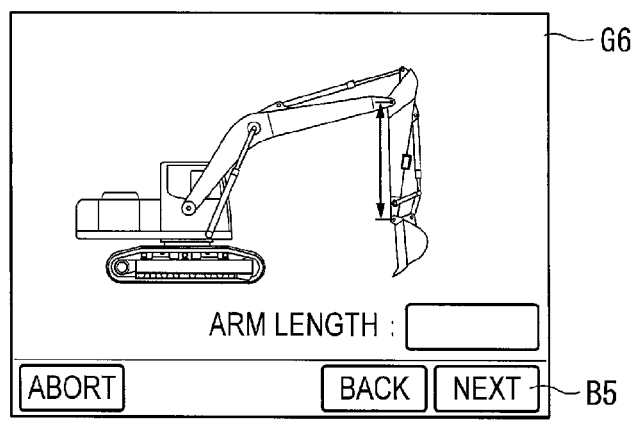
FIG. 15 is another schematic view showing a screen image for calibrating the inclination sensor according to the exemplary embodiment.

After the calibration of the inclination sensor 100 provided to the boom 31 is completed, a completion button B4 is pressed. Then, an image G6 as shown in FIG. 15 is displayed, where the operator inputs a length of the arm 32 (specifically the distance between the arm pin 38 and the bucket pin 39) and presses a button B5.

Figure 16:
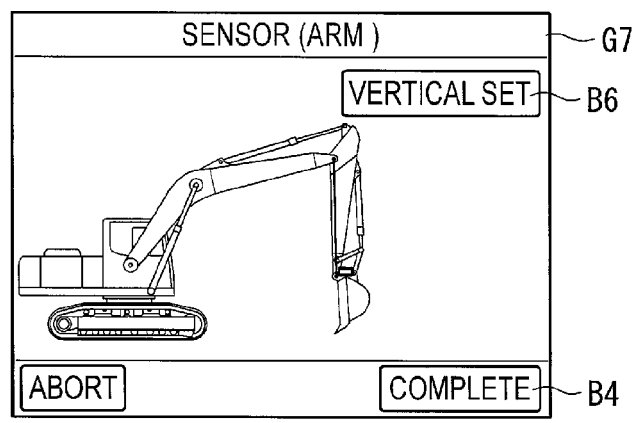
FIG. 16 is still another schematic view showing a screen image for calibrating the inclination sensor according to the exemplary embodiment.

When the button B5 is pressed, an image G7 as shown in FIG. 16 is displayed. In view of the image, the attitude of the working equipment 3 is adjusted so that the line segment L2 connecting the arm pin 38 and the bucket pin 39 is vertically situated. Subsequently, when the operator presses a vertical set button B6, the inclination angle detected by the inclination sensor 100 provided to the arm 32 is used as a calibration parameter when the arm 32 is vertically situated.

Then, the inclination sensor 100 provided to the bucket 33 is also calibrated in the same manner as the above in an attitude where the line segment connecting the bucket pin 39 and the blade edge P of the bucket 33 is horizontally situated. The working equipment parameters for the working equipment are stored in the storage 72A.

Figure 17:
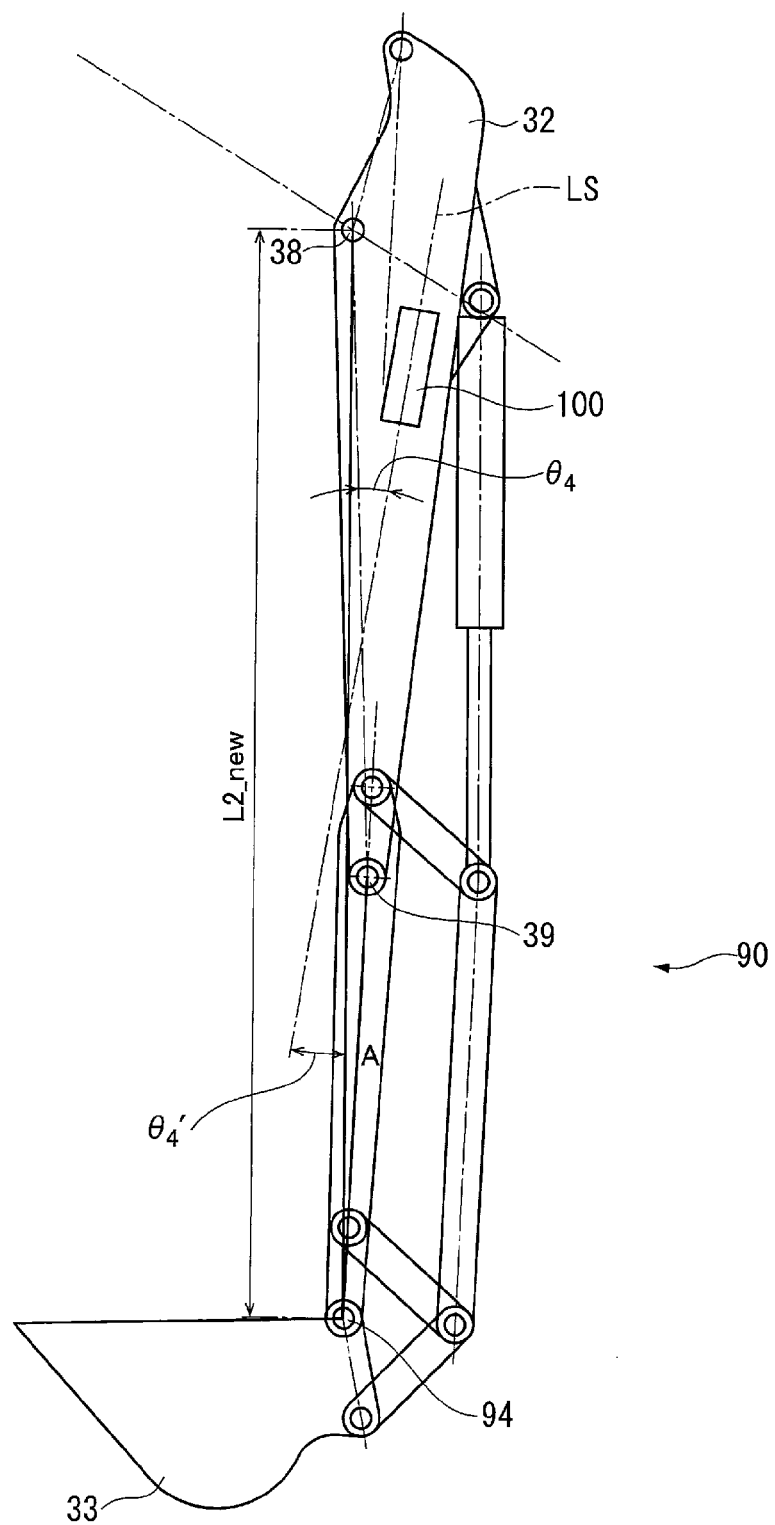
FIG. 17 is a side view showing an inclination sensor attached to an arm attached with an extension arm according to the exemplary embodiment.

When the extension arm 90 is attached as shown in FIG. 17 to the arm 32 having the inclination sensor 100 that is disposed in an inclined manner and a line segment L2_new connecting the arm pin 38 and the second bucket pin 94 is vertically situated, the angle (correction information) of the inclination sensor 100 with respect to the line segment L2_new changes.

Figure 18:
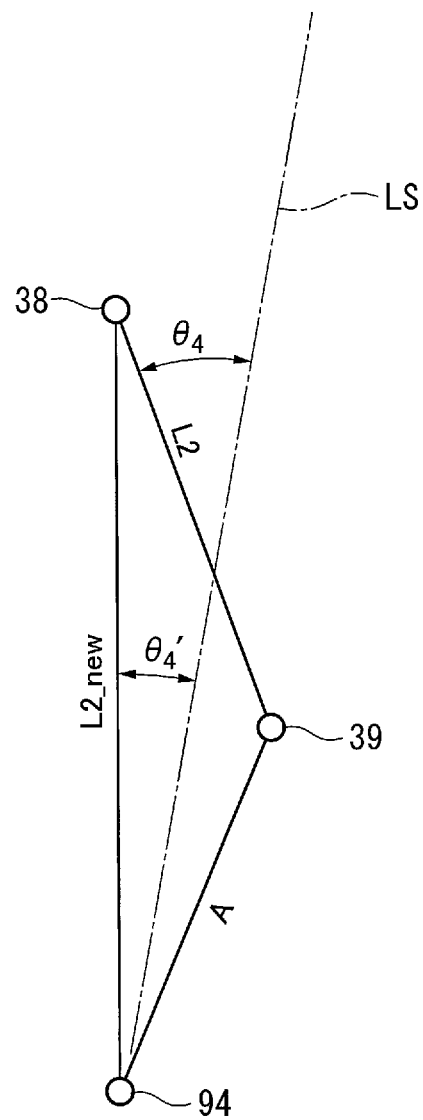
FIG. 18 is a schematic view for explaining an angular relationship between the inclination sensor and the extension arm according to the exemplary embodiment.

More specifically, when an arm length A of the extension arm 90 is added to the line segment L2 and the line segment L2_new is vertically situated as shown in FIG. 18, the angle defined by the inclination sensor 100 with respect to the line segment L2_new is θ4'.

Accordingly, when the extension arm 90 is attached, the angle θ4' has to be calculated. The angle θ4' can be calculated according to an equation (12) using the normal working equipment parameters. It should be noted that, in the equation (12), L2 represents a distance between the arm pin 38 and the bucket pin 39 and A represents a length of the extension arm 90. L2_new represents a distance between the arm pin 38 and the second bucket pin 94 when the extension arm 90 is attached, which is an actual measurement value.

Equation 12

$$\theta 4' = \theta 4 - \arccos\left(\frac{\text{L2\_new}^2 + L2 - A^2}{2\text{L2\_new}L2}\right) \quad (12)$$

When the extension arm 90 is attached, the length L2_new of the line segment connecting the arm pin 38 and the second bucket pin 94 is inputted on the image G6 in FIG. 15 as the arm length.

After the extension arm 90 is attached, the attitude calculating unit 72C of the display controller 72 calculates the attitude of the working equipment 3 from the detection values of the inclination sensor 100 based on the angle θ4' calculated using a equation (14).

The working equipment parameter correction unit 89 of the calibration unit 80 keeps the normal working equipment parameters. When the arm length is restored to the normal arm length after the extension arm 90 is removed in the image G6 shown in FIG. 15, the working equipment parameter correction unit 89 outputs the original working equipment parameters to the attitude calculating unit 72C and the attitude calculating unit 72C calculates the attitude of the working equipment 3 based on the original working equipment parameters.

The same functions and effects as those in the above-described first exemplary embodiment can be obtained in the second exemplary embodiment.

Modification(s)

It should be understood that the scope of the invention is not limited to the above-described exemplary embodiment(s), but includes modifications and improvements compatible with the invention.

For instance, though the above-described exemplary embodiments exemplarily describe the hydraulic excavator 1, the invention is applicable to a backhoe and the like.

The invention claimed is:

1. A work machine comprising:
a work machine body;
first working equipment swingably connected to the work machine body;
second working equipment attachable to the first working equipment and comprising a parallel link;
a swing angle detector configured to detect swing angle information of the first working equipment with respect to the work machine body;
an attitude calculating unit configured to calculate an attitude angle of the first working equipment based on the detected swing angle information of the first working equipment;
a working equipment parameter storage configured to store a first working equipment parameter that is set for a component of the first working equipment;
a correction information acquiring unit that is configured to acquire information on the second working equipment as correction information; and
a working equipment parameter correction unit that is configured to correct the first working equipment parameter based on the correction information acquired by the correction information acquiring unit.

2. The work machine according to claim 1, further comprising:
a hydraulic cylinder configured to swing the first working equipment, wherein
the swing angle detector is a stroke displacement detector configured to detect a stroke displacement of the hydraulic cylinder.

3. The work machine according to claim 1, further comprising:
a display unit, wherein
the working equipment parameter correction unit displays the attitude of the first working equipment or an attitude of the second working equipment on the display unit.

4. The work machine according to claim 1, wherein
the working equipment parameter corrected by the working equipment parameter correction unit is outputted to a working equipment controller configured to control the first working equipment.

5. The work machine according to claim 1, wherein
the first working equipment comprises an arm and a bucket.

6. The work machine according to claim 5, wherein
the second working equipment is a parallel-link working equipment provided at an end of the arm.

7. The work machine according to claim 1, wherein
the work machine body comprises a carrier, and an upper structure.

8. A correction method of a parameter for a work machine, the work machine comprising:
a work machine body;
first working equipment swingably connected to the work machine body;
second working equipment attachable to the first working equipment and comprising a parallel link;
a swing angle detector configured to detect swing angle information of the first working equipment with respect to the work machine body;
an attitude calculating unit configured to calculate an attitude angle of the first working equipment based on the detected swing angle information of the first working equipment; and
a working equipment parameter storage configured to store a first working equipment parameter that is set for a component of the first working equipment, the method being used for correcting the first working equipment parameter, the method comprising:

acquiring information on the second working equipment as correction information; and correcting the first working equipment parameter based on the acquired correction information, the acquiring of the information on the second working equipment and the correcting of the first working equipment parameter being performed by a computer.

* * * * *